US012573779B2

(12) United States Patent
Lee

(10) Patent No.: US 12,573,779 B2
(45) Date of Patent: Mar. 10, 2026

(54) PLUG HAVING LEAKAGE CURRENT LIMITING FUNCTION

(71) Applicant: VISION TECH Corporation, Busan (KR)

(72) Inventor: Ho Seok Lee, Busan (KR)

(73) Assignee: VISION TECH Corporation, Busan (KR)

( * ) Notice: Subject to any disclaimer, the term of this patent is extended or adjusted under 35 U.S.C. 154(b) by 290 days.

(21) Appl. No.: 18/224,393

(22) Filed: Jul. 20, 2023

(65) Prior Publication Data

US 2024/0275095 A1 Aug. 15, 2024

(30) Foreign Application Priority Data

Feb. 13, 2023 (KR) ........................ 10-2023-0018571

(51) Int. Cl.

*H01R 13/04* (2006.01)
*H01R 13/64* (2006.01)
*H01R 13/652* (2006.01)
*H01R 24/30* (2011.01)

(52) U.S. Cl.

CPC ............. *H01R 13/04* (2013.01); *H01R 13/64* (2013.01); *H01R 13/652* (2013.01); *H01R 24/30* (2013.01)

(58) Field of Classification Search

None
See application file for complete search history.

(56) References Cited

U.S. PATENT DOCUMENTS

2015/0270031 A1* 9/2015 Joo ........................ H01R 13/70 200/51 R
2020/0317069 A1* 10/2020 Akai ........................ B60L 3/00
2024/0063590 A1* 2/2024 Youn ........................ H01R 13/24
2024/0275097 A1* 8/2024 Lee ........................ H01R 13/10

FOREIGN PATENT DOCUMENTS

KR 10-2005-0037986 A 4/2005
KR 10-2013-0039691 A 4/2013
KR 10-1625493 B1 5/2016
KR 10-2016-0082435 A 7/2016
KR 10-2016-0149610 A 12/2016

OTHER PUBLICATIONS

Non-final Office Action mailed on Jun. 17, 2024 from the Korean Patent Office for Korean Application No. 10-2023-0018571.
Final Office Action mailed on Jan. 11, 2025 from the Korean Patent Office for Korean Application No. 10-2023-0018571.

* cited by examiner

*Primary Examiner* — Oscar C Jimenez
(74) *Attorney, Agent, or Firm* — Insight Law Group, PLLC; Seung Lee

(57) ABSTRACT

The present disclosure relates to a plug having a leakage current limiting function, in which a current leaked from a phase voltage line (R line or T line or S line) plug pin of the plug may be limited by expanding an area of a neutral line (N line) plug pin of the plug of an electronic device, and thus the risk of electric shock to a human body due to the leakage current can be minimized.

6 Claims, 5 Drawing Sheets

PLUG HAVING LEAKAGE CURRENT LIMITING FUNCTION

CROSS-REFERENCE TO RELATED APPLICATION

This application claims priority to and the benefit of Korean Patent Application No. 10-2023-0018571 filed on Feb. 13, 2023, the disclosure of which is incorporated herein by reference in its entirety.

BACKGROUND

1. Field of the Invention

The present disclosure relates to a plug of an electronic device, and particularly, to a plug having a leakage current limiting function.

2. Discussion of Related Art

Korean Patent Registration No. 10-1625493 (published on May 30, 2016) previously filed and registered by the applicant of the present disclosure discloses that a leakage current decreases as an area ratio difference between two flat conductors increases. This technology prevents electric shock by limiting the leakage current by using an area difference between conductor electrodes.

The present inventor has studied a technology capable of limiting a current leaked from a phase voltage line (R line or T line or S line) plug pin of a plug of an electronic device by expanding an area of a neutral line (N line) plug pin of the plug.

RELATED ART DOCUMENT

Patent Document

Korean Patent Registration No. 10-1625493 (published on May 30, 2016)

SUMMARY OF THE INVENTION

The present disclosure is directed to providing a plug having a leakage current limiting function, which may limit a current leaked from a phase voltage line (R line or T line or S line) plug pin of the plug by expanding an area of a neutral line (N line) plug pin of the plug of an electronic device.

A plug having a leakage current limiting function includes a phase voltage line plug pin to which a phase voltage line (R line or T line or S line) of an electronic device is connected, a neutral line plug pin to which a neutral line (N line) of the electronic device is connected, a ground pin to which a ground line (G line) of the electronic device is connected, and a neutral line plug pin area expansion unit that is in electrical contact with the neutral line plug pin to expand an area of the neutral line plug pin so as to limit a leakage current.

The neutral line plug pin area expansion unit may be implemented in the form of a metal body having an eccentric closed surface, which is inscribed with the neutral line plug pin and spaced apart from the phase voltage line plug pin.

The neutral line plug pin area expansion unit may be implemented in the form of a metal body having an open surface, which is in contact with the neutral line plug pin and not in contact with the phase voltage line plug pin.

The plug may further include a plug body made of an insulating material and equipped with the phase voltage line plug pin, the neutral line plug pin, the ground pin, and the neutral line plug pin area expansion unit, the phase voltage line plug pin and the neutral line plug pin partially protruding forward, and the ground pins being partially exposed on both sides.

A pair of cut surfaces may be formed by partially cutting both surfaces in a direction perpendicular to both sides of the plug body on which the ground pins are partially exposed, and a guide protrusion that guides the plug body so that the plug body is correctly coupled to a plug coupling groove of an electrical outlet only in a specific rotational direction may protrude from each of the pair of cut surfaces.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
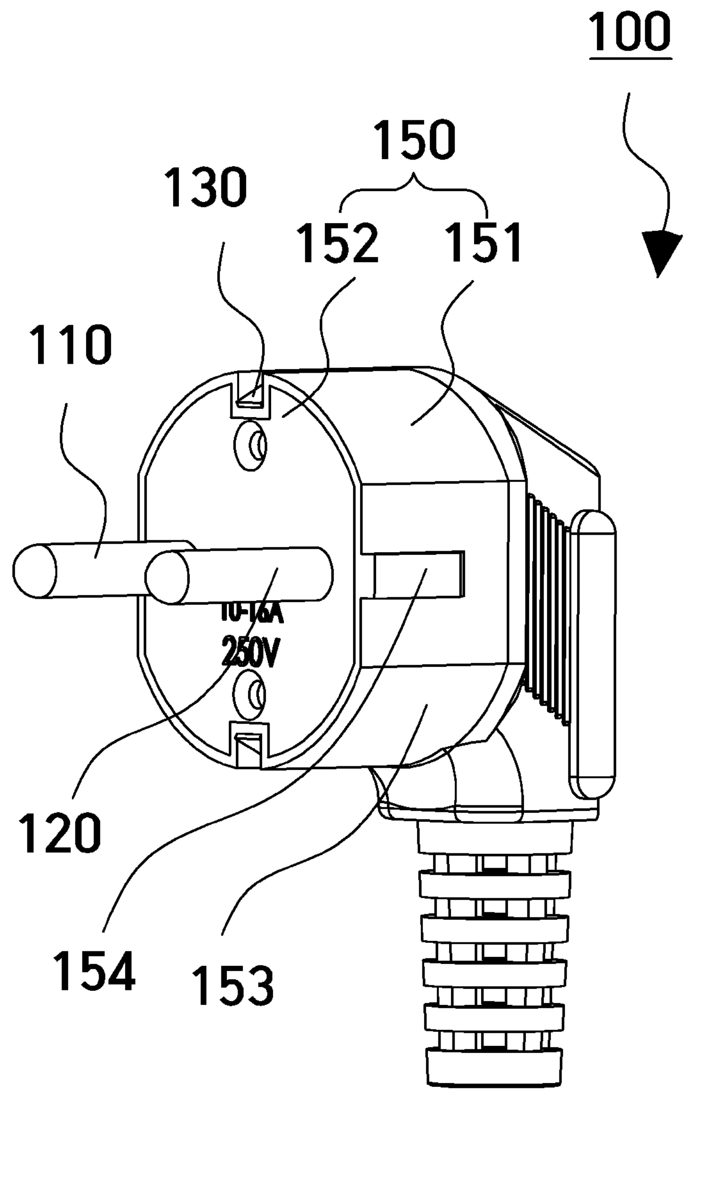
FIG. 1 is a perspective view illustrating an exterior of a plug having a leakage current limiting function according to the present disclosure.

Hereinafter, the present disclosure will be described in detail so that those skilled in the art may easily understand and reproduce the present disclosure through exemplary embodiments described with reference to the accompanying drawings. Although specific embodiments are illustrated in the drawings and related detailed descriptions are made, the embodiments and descriptions are not intended to limit various embodiments of the present disclosure to any particular form.

In the description of the present disclosure, when it is determined that the detailed description of related widely known functions or configurations may make the subject matter of the embodiments of the present disclosure unclear, the detailed description will be omitted.

It should be understood that, when it is mentioned that a first component is "connected" or "coupled" to a second component, the first component may be directly connected or coupled to the second component, or a third component may be present between the first component and the second component.

On the other hand, it should be understood that, when a first component is "directly connected" or "directly coupled" to a second component, a third component is not present therebetween.

Figure 2:
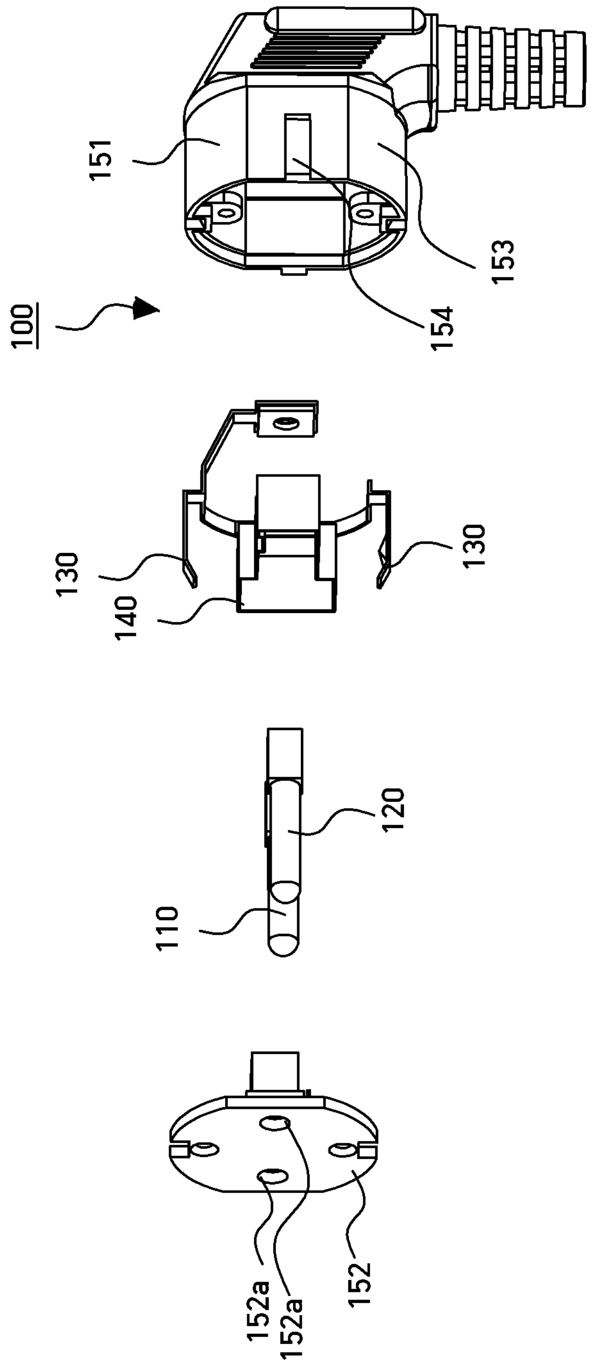
FIG. 2 is an exploded perspective view illustrating the plug having a leakage current limiting function according to the present disclosure.
Figure 3:
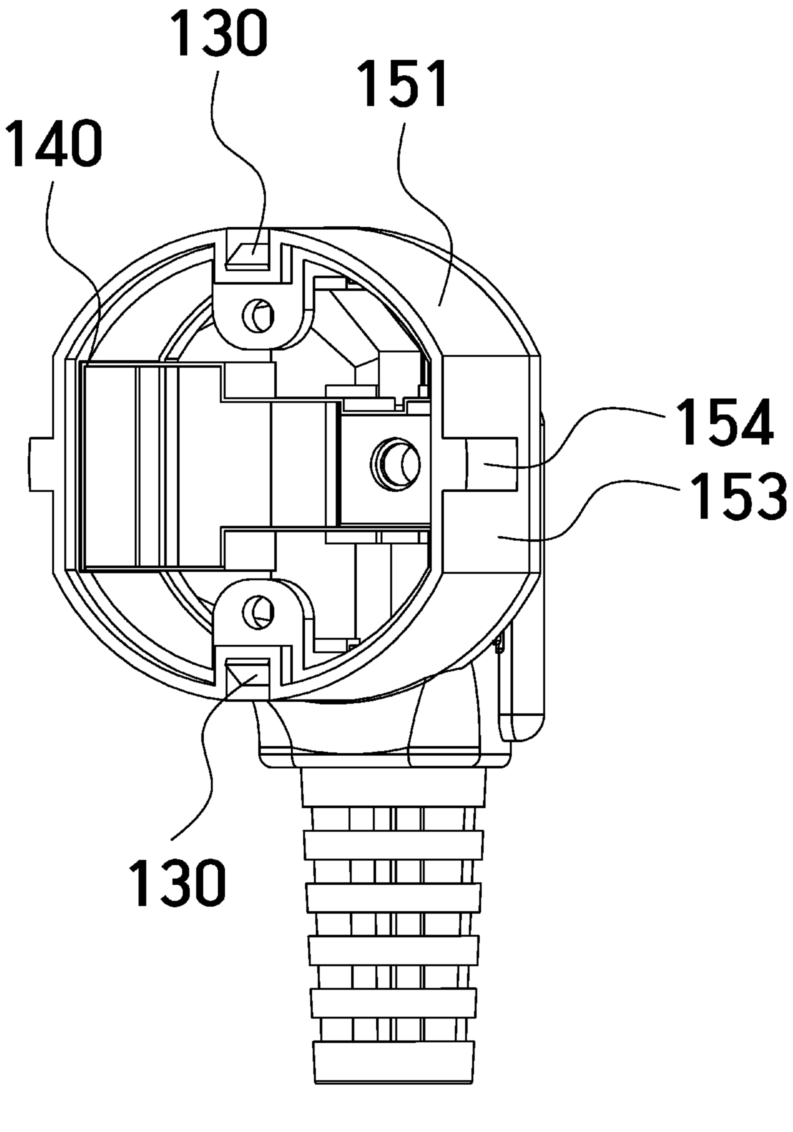
FIG. 3 is a cross-sectional view illustrating the plug having a leakage current limiting function according to the present disclosure.

FIG. 1 is a perspective view illustrating an exterior of a plug having a leakage current limiting function according to the present disclosure, FIG. 2 is an exploded perspective view illustrating the plug having a leakage current limiting function according to the present disclosure, and FIG. 3 is a cross-sectional view illustrating the plug having a leakage current limiting function according to the present disclosure.

As illustrated in FIGS. 1 to 3, a plug 100 having a leakage current limiting function according to an embodiment includes a phase voltage line plug pin 110, a neutral line plug pin 120, a ground pin 130, and a neutral line plug pin area expansion unit 140.

The phase voltage line plug pin 110 made of a conductive material is connected to a phase voltage line (R line or T line or S line) (not illustrated) of an electronic device. The phase voltage line plug pin 110 is inserted into a phase voltage line plug pin insertion hole (not illustrated) formed in a bottom surface of a plug coupling groove (not illustrated) formed in a front housing (not illustrated) of an electrical outlet (not illustrated) and thus is electrically connected to a phase voltage line terminal (not illustrated) connected to the phase voltage line (R line or T line or S line) (not illustrated) of a commercial alternating current (AC) power system.

The neutral line plug pin 120 made of a conductive material is connected to a neutral line (N line) (not illustrated) of the electronic device. The neutral line plug pin 120 is inserted into a neutral line plug pin insertion hole (not illustrated) in the bottom surface of the plug coupling groove formed in the front housing of the electrical outlet and thus is electrically connected to a neutral line terminal (not illustrated) connected to the neutral line (N line) (not illustrated) of the commercial AC power system.

The ground pin 130 made of a conductive material is connected to a ground line (G line) (not illustrated) of the electronic device. The ground pin 130 is electrically connected to a ground terminal (not illustrated) of the electrical outlet connected to the ground.

The neutral line plug pin area expansion unit 140 made of a conductive material is in electrical contact with the neutral line plug pin 120 to expand an area of a neutral line plug pin so as to limit a leakage current. The area of the neutral line plug pin 120 becomes greater than the phase voltage line plug pin 110 and the ground pin 130 by the neutral line plug pin area expansion unit 140, and thus the leakage current becomes very small. As the leakage current becomes smaller, the risk of electric shock deceases, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral line plug pin of the present disclosure) connected to a negative terminal becomes greater than an area of the flat plate-shaped conductor (corresponding to the phase voltage line plug pin of the present disclosure) connected to a positive terminal of a power source.

In detail, a closed loop is not normally configured in a portion of the neutral line plug pin 120 where an area is expanded by the neutral line plug pin area expansion unit 140, but when the plug 100 having a leakage current limiting function is submerged in water due to flooding, the closed loop is configured.

When the plug 100 having a leakage current limiting function is flooded and submerged in water to form the closed loop, a current flows through the phase voltage line plug pin 110, and the current flows through the phase voltage line plug pin 110, the water, the neutral line plug pin area expansion unit 140, and the neutral line plug pin 120 in this order.

In this process, the current leaked from the phase voltage line plug pin 110 does not flow to the human body having a relatively very high resistance but flows to the neutral line plug pin area expansion unit 140 through the water and is drawn in the neutral line (N line) through the neutral line plug pin 120. Thus, the leakage current is prevented from flowing to the human body to minimize the risk of electric shock to the human body.

By this implementation, according to the present disclosure, a current leaked from the phase voltage line (R line or T line or S line) plug pin of the plug may be limited by expanding an area of the neutral line (N line) plug pin of the plug of the electronic device. Thus, the risk of electric shock to the human body due to the leakage current can be minimized.

Meanwhile, according to an additional aspect of the present disclosure, the neutral line plug pin area expansion unit 140 may be implemented in the form of a metal body having an eccentric closed surface, which is inscribed with the neutral line plug pin 120 and spaced apart from the phase voltage line plug pin 110.

Figure 4:
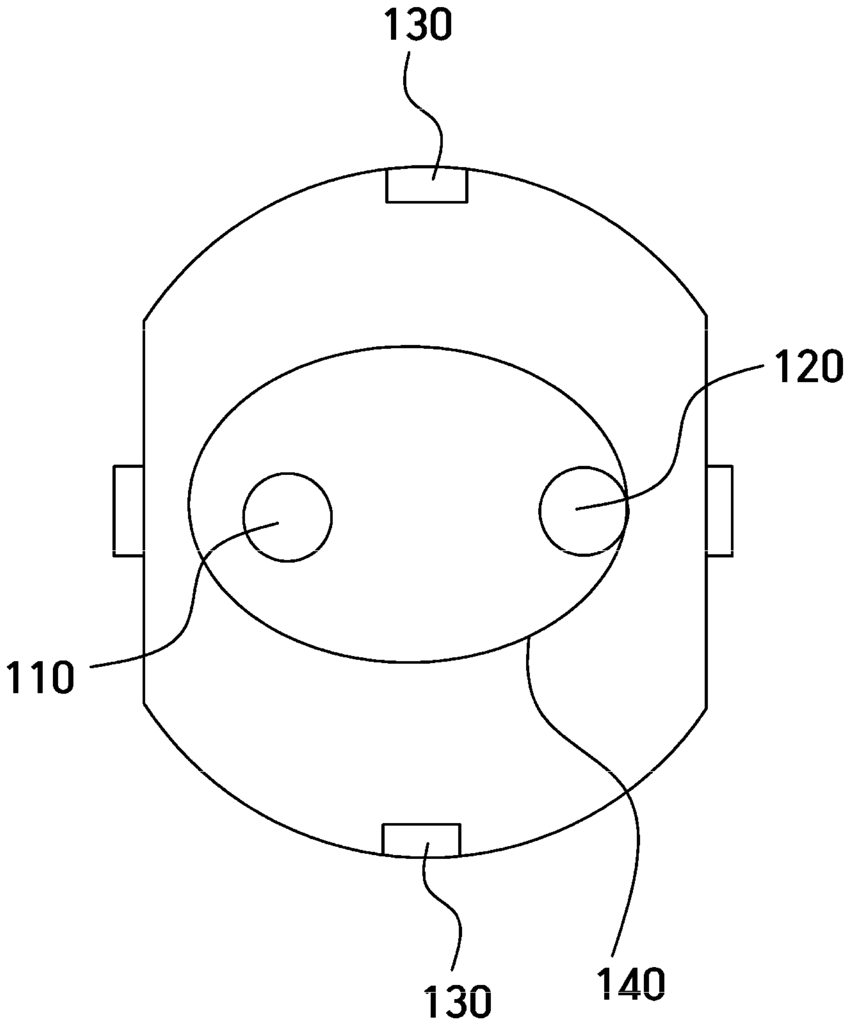
FIG. 4 is a view illustrating an example in which a neutral line plug pin area expansion unit of the plug having a leakage current limiting function is implemented in the form of a metal body having a closed surface according to the present disclosure.

FIG. 4 is a view illustrating an example in which a neutral line plug pin area expansion unit of the plug having a leakage current limiting function is implemented in the form of a metal body having a closed surface according to the present disclosure.

Referring to FIG. 4, it may be seen that the neutral line plug pin area expansion unit 140 is implemented in the form of a metal body having an eccentric closed surface, which is inscribed with the neutral line plug pin 120 and spaced apart from the phase voltage line plug pin 110.

By this implementation, according to the present disclosure, a current leaked from the phase voltage line (R line or T line or S line) plug pin of the plug may be limited by expanding an area of the neutral line (N line) plug pin of the plug of the electronic device through the neutral line plug pin area expansion unit in the form of a metal body having an eccentric closed surface. Thus, the risk of electric shock to the human body due to the leakage current can be minimized.

Meanwhile, according to an additional aspect of the present disclosure, the neutral line plug pin area expansion unit 140 may be implemented in the form of a metal body having an open surface, which is in contact with the neutral line plug pin 120 and not in contact with from the phase voltage line plug pin 110.

Figure 5:
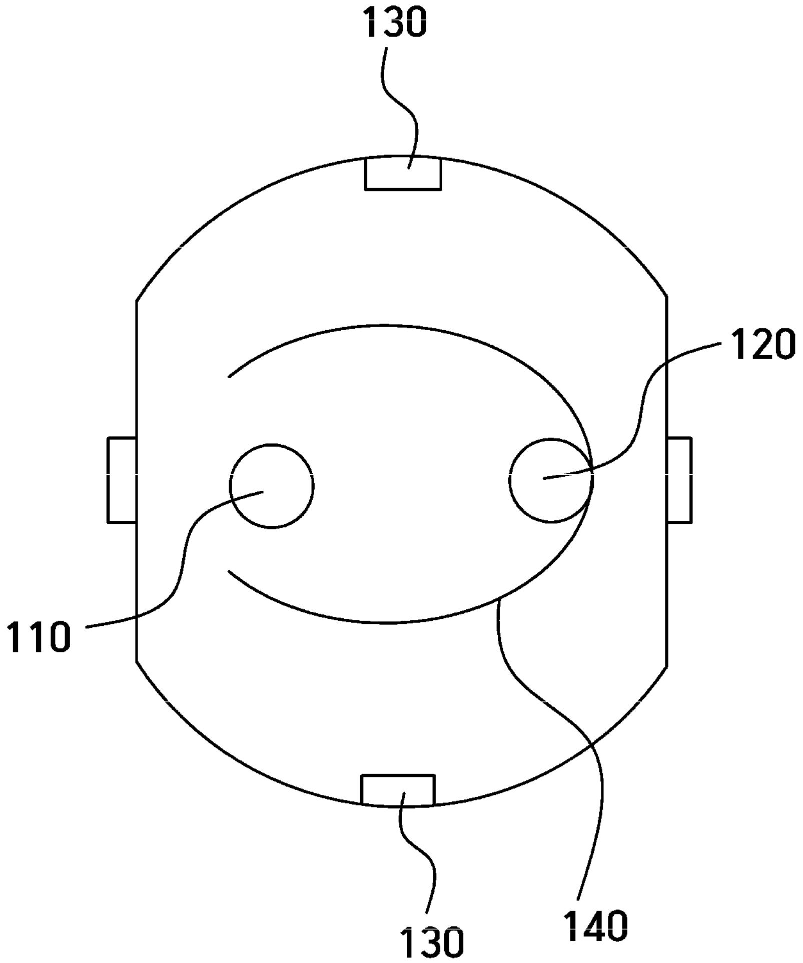
FIG. 5 is a view illustrating an example in which the neutral line plug pin area expansion unit of the plug having a leakage current limiting function is implemented in the form of a metal body having an open surface according to the present disclosure.

FIG. 5 is a view illustrating an example in which the neutral line plug pin area expansion unit of the plug having a leakage current limiting function is implemented in the form of a metal body having an open surface according to the present disclosure.

Referring to FIG. 5, it may be seen that the neutral line plug pin area expansion unit 140 is implemented in the form of a metal body having an open surface, which is in contact with the neutral line plug pin 120 and not in contact with the phase voltage line plug pin 110.

By this implementation, according to the present disclosure, a current leaked from the phase voltage line (R line or T line or S line) plug pin of the plug may be limited by expanding the area of the neutral line (N line) plug pin of the plug of the electronic device through the neutral line plug pin area expansion unit in the form of a metal body having an open surface. Thus, the risk of electric shock to the human body due to the leakage current can be minimized.

Meanwhile, according to an additional aspect of the present disclosure, the plug 100 having a leakage current limiting function may further include a plug body 150 made of an insulating material. The plug body 150 is equipped with the phase voltage line plug pin 110, the neutral line plug pin 120, the ground pin 130, and the neutral line plug pin area expansion unit 140. The phase voltage line plug pin 110 and the neutral line plug pin 120 partially protrude forward, and the ground pins 130 are partially exposed on both sides.

In this case, the plug body 150 may include a rear housing 151 and a front housing 152 coupled to the front of the rear housing 151 using a screw coupling method or the like. The phase voltage line plug pin 110, the neutral line plug pin 120, the ground pin 130, and the neutral line plug pin area expansion unit 140 are mounted in the rear housing 151. The front housing 152 includes a plurality of plug pin protrusion holes 152*a* through which the phase voltage line plug pin 110 and the neutral line plug pin 120 are inserted from a rear side, partially protrude forward, and thus are exposed.

Meanwhile, a pair of cut surfaces 153 are formed by partially cutting both surfaces in a direction perpendicular to both sides of the plug body 150 on which the ground pins 130 are partially exposed. A guide protrusion 154 that guides the plug body 150 so that the plug body 150 is correctly coupled to the plug coupling groove of the electrical outlet only in a specific rotational direction protrudes from each of the pair of cut surfaces 153. Thus, the plug may be easily inserted into and coupled to the electrical outlet.

As described above, according to the present disclosure, a current leaked from the phase voltage line (R line or T line or S line) plug pin of the plug may be limited by expanding the area of the neutral line (N line) plug pin of the plug of the electronic device through the neutral line plug pin area expansion unit in the form of a metal body having an open surface. Thus, since the risk of electric shock to the human body due to the leakage current can be minimized, the purpose of the present disclosure presented above can be achieved.

According to the present disclosure, a current leaked from a phase voltage line (R line or T line or S line) plug pin of a plug can be limited by expanding an area of a neutral line (N line) plug pin of the plug of an electronic device. Thus, the risk of electric shock to the human body due to the leakage current can be minimized.

Various embodiments disclosed in the present specification and the drawings are merely presented as specific examples to help understanding and are not intended to limit the scope of various embodiments of the present disclosure.

Thus, it should be interpreted that the scope of various embodiments of the present disclosure includes all changes or modifications derived based on the technical spirit of various embodiments of the present disclosure in addition to the embodiments described herein.

What is claimed is:

1. A plug having a leakage current limiting function, the plug comprising:

a phase voltage line plug pin to which a phase voltage line (R line or T line or S line) of an electronic device is connected;

a neutral line plug pin to which a neutral line (N line) of the electronic device is connected;

a ground pin to which a ground line (G line) of the electronic device is connected; and a neutral line plug pin area expansion unit that is in electrical contact with the neutral line plug pin to expand an area of the neutral line plug pin so as to limit a leakage current, wherein the neutral line plug pin area expansion unit is implemented in the form of a metal body having an eccentric closed surface, which is inscribed with the neutral line plug pin and spaced apart from the phase voltage line plug pin.

2. The plug of claim 1, further comprising:

a plug body made of an insulating material and equipped with the phase voltage line plug pin, the neutral line plug pin, the ground pin, and the neutral line plug pin area expansion unit, the phase voltage line plug pin and the neutral line plug pin partially protruding forward, and the ground pin being partially exposed on each of both sides.

3. The plug of claim 2, wherein a pair of cut surfaces are formed by partially cutting both surfaces in a direction perpendicular to both sides of the plug body on which the ground pins are partially exposed, and a guide protrusion that guides the plug body so that the plug body is correctly coupled to a plug coupling groove of an electrical outlet only in a specific rotational direction protrudes from each of the pair of cut surfaces.

4. A plug having a leakage current limiting function, the plug comprising:

a phase voltage line plug pin to which a phase voltage line (R line or T line or S line) of an electronic device is connected;

a neutral line plug pin to which a neutral line (N line) of the electronic device is connected;

a ground pin to which a ground line (G line) of the electronic device is connected; and a neutral line plug pin area expansion unit that is in electrical contact with the neutral line plug pin to expand an area of the neutral line plug pin so as to limit a leakage current, wherein the neutral line plug pin area expansion unit is implemented in the form of a metal body having an open surface, which is in contact with the neutral line plug pin and not in contact with the phase voltage line plug pin.

5. The plug of claim 4, further comprising:

a plug body made of an insulating material and equipped with the phase voltage line plug pin, the neutral line plug pin, the ground pin, and the neutral line plug pin area expansion unit, the phase voltage line plug pin and the neutral line plug pin partially protruding forward, and the ground pin being partially exposed on each of both sides.

6. The plug of claim 5, wherein a pair of cut surfaces are formed by partially cutting both surfaces in a direction perpendicular to both sides of the plug body on which the ground pins are partially exposed, and a guide protrusion that guides the plug body so that the plug body is correctly coupled to a plug coupling groove of an electrical outlet only in a specific rotational direction protrudes from each of the pair of cut surfaces.

* * * * *